Sept. 8, 1959     F. H. ANDERSEN     2,903,094
COLLAPSIBLE WHEEL BLOCK
Filed Oct. 18, 1956
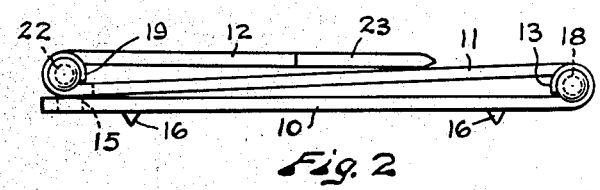
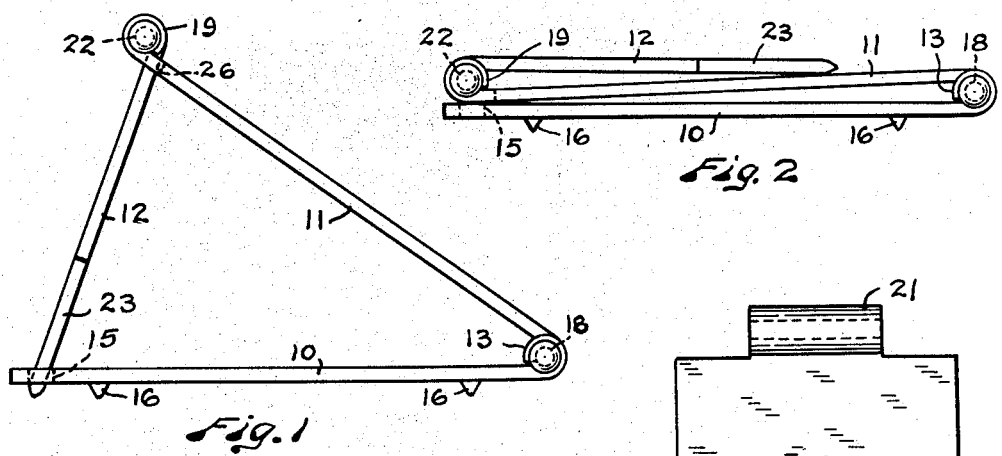
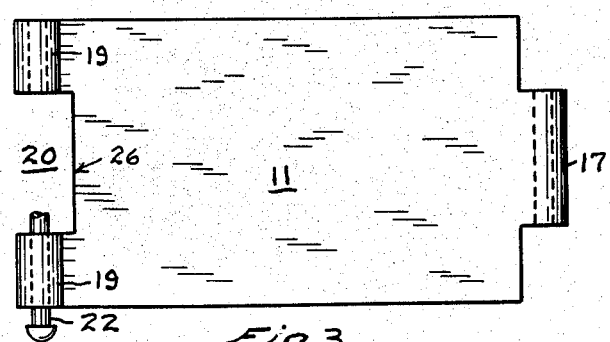
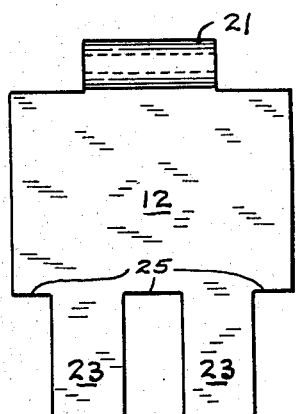
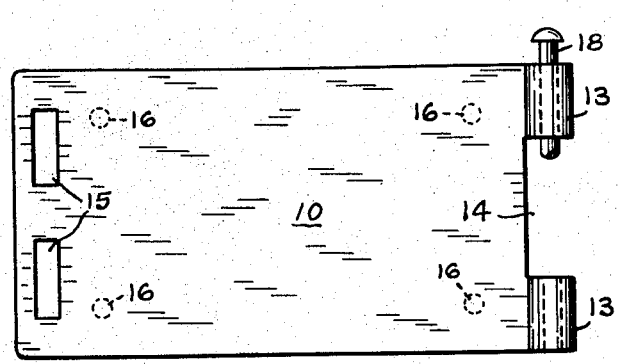
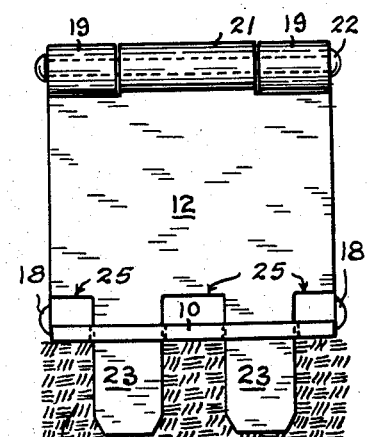
INVENTOR.
Fritz H. Andersen
BY
Fred C. Matheny
ATTORNEY

United States Patent Office 2,903,094
Patented Sept. 8, 1959

2,903,094

COLLAPSIBLE WHEEL BLOCK

Fritz H. Andersen, Lewiston, Idaho

Application October 18, 1956, Serial No. 616,665

2 Claims. (Cl. 188—32)

This invention relates to a collapsible wheel block or chock.

Objects of this invention are to provide a wheel block or chock which is simple but strong and sturdy in construction, not expensive to manufacture, easy to handle, relatively light in weight, and capable of being folded into flat and compact form when not in use.

Another object is to provide a folding wheel block which will not sink into an ordinary roadbed when subjected to pressure by a vehicle wheel and one which is highly resistant to sliding on packed snow, ice or frozen ground.

In parking vehicles on sloping or inclined surfaces it is often desirable in the interest of maximum safety to block one or more wheels of the vehicle and this is frequently done with stones, wooden blocks and the like when they are available. Wheel blocking devices of this type are unhandy and cumbersome to carry in a vehicle and can not always be picked up at locations where they are needed and it is an object of this invention to provide a folding wheel block which is compact and convenient to carry in the vehicle and which may be kept available for use at all times.

Other objects of this invention will be apparent from the following description taken in connection with the accompanying drawings.

In the drawings:

Figure 1 is a side elevation of my folding wheel blocking device showing the same set up and ready for use.

Fig. 2 is a side elevation showing the same device folded.

Fig. 3 is a detached top plan view of a wheel supporting plate embodied in the device.

Fig. 4 is a detached top plan view of a base plate.

Fig. 5 is a detached view in elevation of a brace plate or strut member.

Fig. 6 is an end view of this wheel block as it may appear when it is set up and prongs which are provided on a brace plate or strut are projected into the roadbed or support on which the device rests.

Fig. 7 is a side elevation of a modified form of the invention showing the same folded.

Like reference numerals refer to like parts throughout the several views.

This wheel blocking device comprises three principal parts, namely, a base plate 10, a wheel supporting plate 11, and a brace plate or strut 12. One end of the base plate 10 has two spaced apart eye members 13 between which is a recess or notch 14. Preferably the eye members 13 are formed by upwardly bending two integral parts of the base plate in cylindrical shape and thus leaving the base plate plane and flat on the bottom. The other end portion of the base plate 10 has at least one and preferably two openings 15 provided therein. These openings, as shown in the drawings are rectangular in shape and are spaced apart. Also preferably a plurality of short spikes or prongs or lugs 16 are rigidly secured to the bottom side of the base plate 10. These spikes or lugs 10 may be varied in shape depending on the kind of supporting surface the blocking device is to be used on.

One end of the wheel supporting plate 11 has a downwardly bent medially positioned cylindrical eye member 17 of suitable width to fit snugly in the notch 14 between the two eye members 13 of the base plate. A pivot pin 18, herein shown to be a rivet, extends through the two eye members 13 and the eye member 17 and pivotally secures the base plate 10 and wheel supporting plate 11 together. The other end of the wheel supporting plate 11, that is the end shown at the left in the drawings, has preferably two eye members 19 formed thereon in spaced apart relation so as to leave a recess or notch 20 therebetween. Preferably the eye members 19 are formed by bending and are offset in the opposite direction from the eye member 17. Thus the eye member 17 is offset downwardly from the normal plane of the wheel supporting plate 11 and the eye members 19 are offset upwardly from the plane of said plate 11.

The upper end of the brace plate or strut 12 has a medially positioned eye member 21 of suitable size and shape to fit within the notch 20 between the eye members 19 of the wheel supporting plate 11 and a pivot pin 22 extends through the two eye members 19 and the eye member 21 and pivotally secures the plates 11 and 12 together.

The brace plate or strut 12 has two spaced apart flat prongs 23 on its lower end and these prongs 23 are suitably positioned and dimensioned so that they will fit within and extend through the openings 15 in the base plate 10 when the wheel block is set up, as shown in Figs. 1 and 6. Shoulders 25 formed at the upper ends of the flat prongs 23 limit the distance of movement of the wheel supporting plate 11 toward the base plate 10 so that the device can not be completely collapsed as long as the prongs 23 are within the openings 15.

When the prongs 23 are withdrawn from the openings 15 the brace plate 12 can be angularly moved clockwise from the operative or set up position in which it is shown in Fig. 1 into a folded position, as shown in Fig. 2, and the three plates 10, 11 and 12 can be folded onto each other in flat compact form. Preferably the plates 11 and 12 are articulated so that the plate 12 will fold upwardly, as shown in Fig. 2, and will be stopped by a shoulder 26 from swinging in an anti-clockwise direction much beyond the position in which it is shown in Fig. 1. However, the wheel supporting plate can be modified as shown in Fig. 7 and hereinafter described and the brace plate reversed side for side so it will fold between the base plate and the wheel supporting plate. Limiting the anti-clockwise swinging movement of the brace plate to approximately the position in which it is shown in Fig. 1 facilitates setting the wheel block up for use under a wheel by aligning the prongs 23 with the slots 15.

When this wheel blocking device is to be used it is opened out into a position as shown in Fig. 1 and placed on the street or road under a wheel. As the wheel moves onto the device it will tend to press the prongs 23 into the surface on which the device rests as shown in Fig. 6 in which said prongs 23 are pressed a substantial distance into a roadbed 24. The amount of penetration of these prongs will depend on the characteristics of the roadbed and this penetration helps to resist sliding movement of the wheel block, particularly on packed and frozen snow and ice, and thus makes the wheel block more efficient. The lugs 16 can be of any desired shape and length and they help to resist sliding movement on pavements having harder surfaces.

In the modified form of the invention shown in Fig. 7 the base plate 10 and brace plate 12 and pivot members 18 and 22 are identical with those shown in Figs. 1 to 6. The wheel supporting plate 11' in Fig. 7 is slightly different in that it has eye members 19' which are curved in the opposite direction from the eye members 19, that is, toward the base plate. The position of the brace plate 12 in Fig. 7 is reversed side for side as respects the position of this same part in Figs. 1, 2 and 6. When thus reversed the brace plate 12 is not self positioning relative to openings 15 but it is possible to fold said brace plate between the plates 10 and 11. The device shown in Fig. 7 functions in a similar manner to the device shown in Figs. 1, 2 and 6 after it is set up.

The foregoing description and accompanying drawings disclose a preferred embodiment of my invention but it will be understood that changes may be made within the scope of the following claims.

I claim:

1. A wheel blocking device comprising a plane flat base plate having two spaced apart aligned transverse slots each of substantial length adjacent one end thereof; a wheel supporting plate having one end portion pivotally connected with the end portion of said base plate remote from said slots for movement between a folded position substantially parallel to said base plate and a wheel supporting position divergently inclined relative to said base plate; and a brace plate pivotally connected with the other end portion of said wheel supporting plate and having two relatively long flat spaced apart prongs of substantial width on its lower end, said prongs being supported and guided in the slots in said base plate when said wheel supporting plate is in an operative position relative to said base plate, said prongs moving through said slots and being capable of penetrating the roadbed on which said base plate rests and affording substantial resistance to wheel pressure tending to slidably move said wheel blocking device.

2. A wheel blocking device comprising a plane flat base plate having two spaced apart aligned transverse slots each of substantial length positioned adjacent one end thereof; a wheel supporting plate having one end portion pivotally connected with the end portion of said base plate remote from said slots for movement between a folded position substantially parallel to said base plate and a wheel supporting position divergently inclined relative to said base plate; a brace plate pivotally connected with the other end portion of said wheel supporting plate and having two relatively long flat spaced apart prongs of substantial width on its lower end, said prongs being supported and guided in said slots, said prongs being of a length substantially greater than the thickness of said base plate and being capable of penetrating a roadbed when said wheel supporting plate is in an operative position relative to said base plate; and shoulder means on said wheel supporting plate limiting swinging movement of said brace plate in one direction, whereby the prongs thereon are aligned with the slots in the base plate when the tips of said prongs are flush with the top plane of the base plate.

References Cited in the file of this patent

UNITED STATES PATENTS

| 1,065,518 | Gammelin | June 24, 1913 |
| 1,768,265 | Nicholls | June 24, 1930 |
| 2,189,323 | Noonan | Feb. 6, 1940 |

FOREIGN PATENTS

| 457,706 | Germany | Mar. 22, 1928 |